United States Patent
Nagano

(10) Patent No.: US 9,491,400 B2
(45) Date of Patent: Nov. 8, 2016

(54) DISPLAY APPARATUS WITH IMAGE PICKUP APPARATUS

(71) Applicant: CANON KABUSHIKI KAISHA, Tokyo (JP)

(72) Inventor: Akihiko Nagano, Ichihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 246 days.

(21) Appl. No.: 14/031,870

(22) Filed: Sep. 19, 2013

(65) Prior Publication Data

US 2014/0098175 A1    Apr. 10, 2014

(30) Foreign Application Priority Data

Oct. 10, 2012    (JP) .................................. 2012-225213

(51) Int. Cl.
*H04N 7/14*     (2006.01)
*G06F 1/16*     (2006.01)

(52) U.S. Cl.
CPC ............ *H04N 7/141* (2013.01); *G06F 1/1605* (2013.01); *H04N 7/144* (2013.01)

(58) Field of Classification Search
USPC ...................................................... 348/14.01
See application file for complete search history.

(56) References Cited

U.S. PATENT DOCUMENTS

| | | | |
|---|---|---|---|
| 8,106,577 B2 * | 1/2012 | Kobayashi ........ | H01L 27/3211 313/501 |
| 2004/0004668 A1 * | 1/2004 | Namazue .......... | H01L 27/14621 348/340 |

FOREIGN PATENT DOCUMENTS

| | | |
|---|---|---|
| CN | 1496490 A | 5/2004 |
| CN | 1574904 A | 2/2005 |
| JP | 2002314899 A | 10/2002 |
| JP | 2005-010407 A | 1/2005 |
| JP | 2008218081 A | 9/2008 |
| JP | 2009-187697 A | 8/2009 |
| JP | 2009187697 A | 8/2009 |

OTHER PUBLICATIONS

May 23, 2016 Korean Office Action, that issued in Korean Patent Application No. 10-2013-0119593.
Nov. 19, 2015 Chinese Office Action, that issued in Chinese Patent Application No. 2013104698802.

* cited by examiner

*Primary Examiner* — Amal Zenati

(74) *Attorney, Agent, or Firm* — Cowan, Liebowitz & Latman, P.C.

(57) ABSTRACT

A display apparatus with an image pickup apparatus has a display unit for displaying an image by a plurality of light-transparent display pixels and an image pickup unit arranged at a rear surface of the display unit to pick up object light from an object at a front surface of the display unit. The display unit has a plurality of light-transparent phase adjustment units which are arranged in correspondence to the display pixels and adjust an optical-path length of object light. The plurality of phase adjustment units have different thicknesses in the optical axis direction of the object light which transmits, and the phase adjustment units having the same thickness are arranged at a predetermined period.

7 Claims, 6 Drawing Sheets

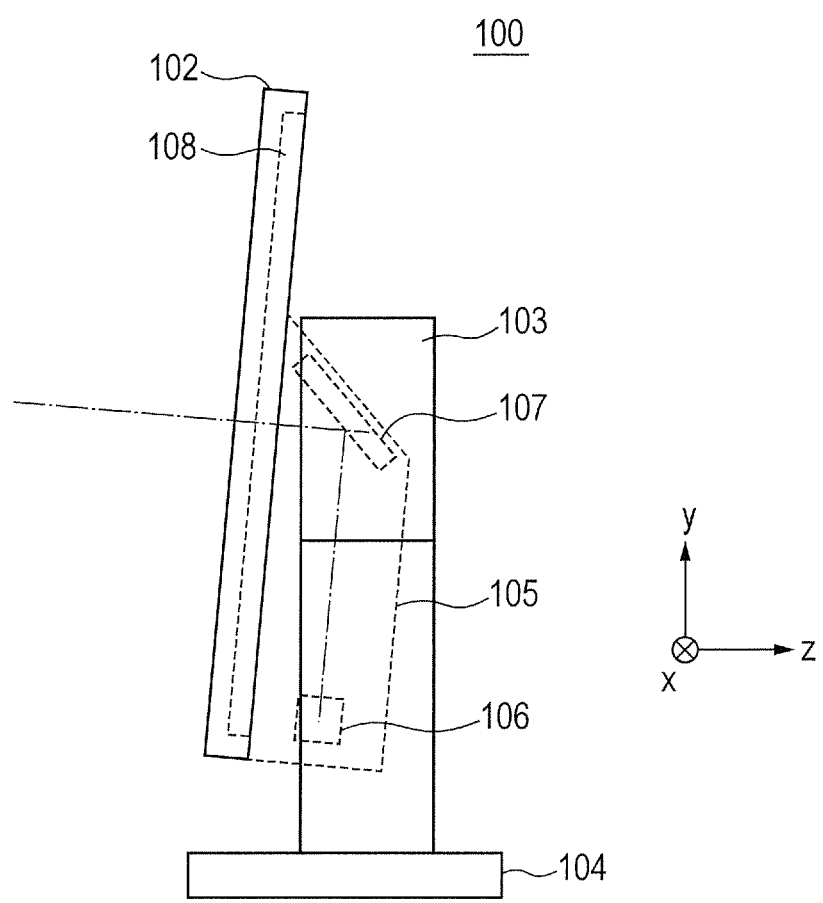

DISPLAY APPARATUS WITH IMAGE PICKUP APPARATUS

BACKGROUND OF THE INVENTION

1. Field of the Invention

The present invention relates to a display apparatus with an image pickup apparatus, where an image pickup device is integrated with a comparatively-thin display device of an organic electroluminescence (EL), liquid crystal, plasma type, or the like and, more particularly, to a display apparatus with an image pickup apparatus suitable for real-time bidirectional communication or the like such as a video phone or the like.

2. Description of the Related Art

In recent years, real-time bidirectional communication such as a video phone or the like can be made owing to a remarkable development of a communication network. The video phone is constructed with an image pickup unit for converting an object image into an electrical image signal and a display unit for converting the electrical image signal into a photosignal and displaying. The user of the video phone makes conversation with a partner while watching the partner's face displayed on a display screen of the display unit and, at the same time, the user's face is photographed by the image pickup unit and sent as an electric signal to the partner side. However, in a device which is used in the bidirectional communication such as a video phone or the like in the related art, since the image pickup unit is disposed at a position adjacent to the display unit or is provided as another separate apparatus, the receiver who is watching the display unit is photographed from the oblique direction. Therefore, a viewpoint of the receiver's face displayed on the display unit is directed to a position different from a viewpoint of a person who is watching the display unit. There is, consequently, such a problem that even if they are mutually talking, it is awkward and uncomfortable as compared with a case where they meet face to face and talk. There is also such a problem that the image pickup apparatus and the display apparatus have to be separately manufactured and assembled as a display apparatus or have to be provided as different apparatuses, so that manufacturing costs rise.

In consideration of such problems, the inventor of the present invention has disclosed the following display apparatus with an image pickup apparatus in the Official Gazette of Japanese Patent Application Laid-Open No. 2005-010407. The display apparatus comprises: a display unit having a plurality of display pixels and light-shielding members arranged among the display pixels; and an image pickup unit arranged in a rear portion of the display unit, wherein the light-shielding member partially has an aperture portion for guiding light to the image pickup unit, and the image pickup unit has an image forming unit at a position corresponding to the aperture portion.

According to the above-described display apparatus with the image pickup apparatus, the operator thereof can be photographed while observing the display unit and a viewpoint of the operator can be made coincide with the partner displayed to the display unit. Since the thin image pickup unit is disposed at a front surface of the display unit, an increase in size of the whole apparatus can be avoided.

However, the position of the partner's face displayed on the display screen of the display unit does not always coincide with the position of the image pickup unit arranged in the display screen. There is also a case where the position of the user who observes the partner's face displayed at the position deviated from the position of the image pickup unit arranged in the display screen of the display unit is also deviated in accordance with the position of the partner's face.

FIGS. 6A and 6B are diagrams for explaining a difference between the viewpoint direction of the user who observes a display unit such as a video phone or the like and the direction of the image pickup unit in the related art. In the diagram, a display panel 108 serving as a display unit, a camera 106 serving as an image pickup unit, and a user 610 are illustrated. A position 611 shown with a mark "x" indicates a partner's face displayed on the display panel 108.

FIG. 6A illustrates the difference between the viewpoint direction of the user and an optical axis direction of the image pickup unit in the case of using a display apparatus in which the camera 106 for photographing the user is built in the display panel 108. In the diagram, the partner's face 611 is displayed at a position (position indicated with the mark "x" in the diagram) deviated from the position of the camera 106 in the positive direction of the x axis (+x direction) in the diagram, and the user 610 observes the partner's face 611 at a position deviated from an optical axis (z axis) of the camera 106. In this case, there is a difference of an angle $\theta_1$ between the photographing direction in which the camera 106 photographs the user 610 and the viewpoint direction of the user 610. If the angle $\theta_1$ is large, a person on the partner's side of the video phone who observed an image of the user photographed by the camera 106 recognizes that the user does not make a conversation while watching the partner's face.

In order to allow the person on the partner's side of the video phone who observed the image of the user photographed by the camera 106 to recognize that he or she is watching the user, it is necessary to decrease an angle $\theta$ between the photographing direction in which the camera 106 photographs the user 610 and the viewpoint direction of the user 610.

Therefore, in order to decrease the angle $\theta$ between the photographing direction in which the camera 106 photographs the user 610 and the viewpoint direction of the user 610, the camera 106 to photograph the user is disposed behind the rear surface of the display panel 108 as illustrated in FIG. 6B. By such a structure, an angle $\theta_2$ between the photographing direction in which the camera 106 photographs the user 610 and the viewpoint direction of the user 610 is made smaller compared with $\theta_1$. Therefore, the person on the side of the partner who observed the image of the user photographed by the camera 106 recognizes that the user is watching the partner himself.

However, if the camera 106 to photograph the user is arranged behind the rear surface of the display panel 108 in order to decrease the angle $\theta$ between the photographing direction in which the camera 106 photographs the user 610 and the viewpoint direction of the user 610, there is the following problem. That is, since the camera 106 disposed behind the rear surface of the display panel 108 has to photograph the user 610 through the display panel 108, there is such a drawback that the image to be photographed deteriorates under an influence of diffraction associated with a periodic structure of the display pixels of the display panel 108.

SUMMARY OF THE INVENTION

It is, therefore, an aspect of the invention to provide a display apparatus with an image pickup apparatus which allows a partner's side who talks over a video phone to recognize that the user is talking while watching the partner himself, and enables a user's image to be photographed with high quality.

To accomplish the above aspect, according to the invention, a display apparatus with an image pickup apparatus, comprises a display unit configured to display an image by a plurality of light-transparent display pixels and an image pickup unit disposed at a rear surface of the display unit to pick up object light from an object at a front surface of the display unit, wherein the display unit has a plurality of light-transparent phase adjustment units which are arranged in correspondence to the display pixels and adjust an optical-path length of the object light, and wherein the plurality of light-transparent phase adjustment units have different thicknesses in an optical axis direction of the object light which transmits, and the phase adjustment units having the same thickness are arranged at a predetermined period.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a side view in another usage state of the display apparatus with the image pickup apparatus according to the first embodiment of the invention.

DESCRIPTION OF THE EMBODIMENTS

Various exemplary embodiments, features, and aspects of the present invention will be described in detail below with reference to the drawings.

Exemplary embodiments of the invention will be described in detail hereinbelow with reference to the drawings.

First Embodiment

Figure 1A:
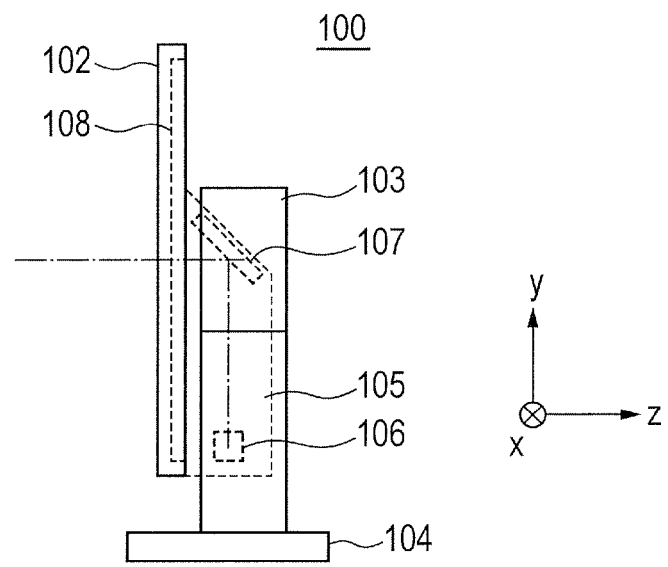
FIGS. 1A and 1B are a side view and a rear view of a display apparatus with an image pickup apparatus according to the first embodiment of the invention.
Figure 1B:
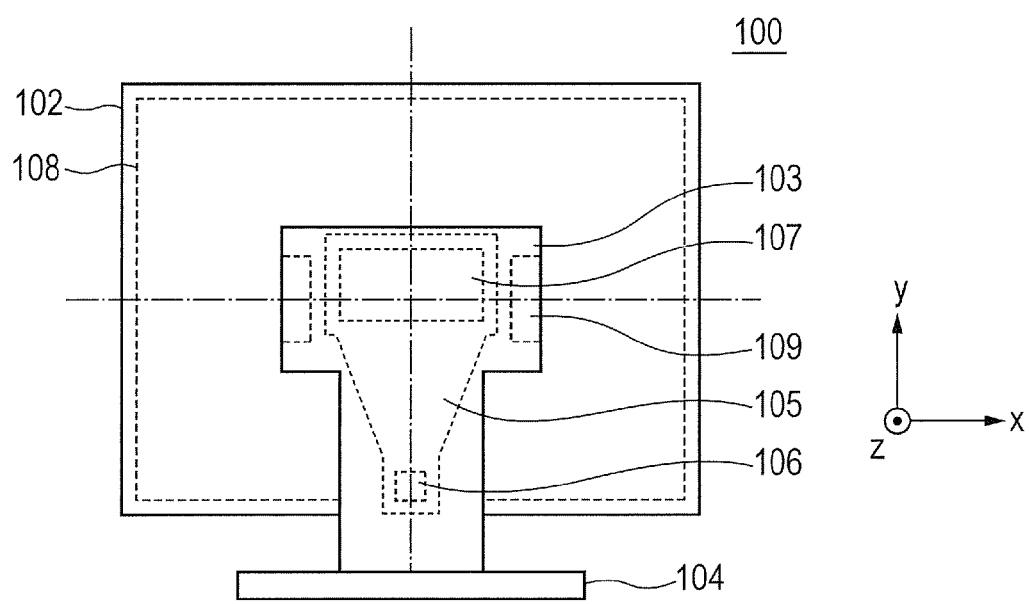

FIGS. 1A and 1B are a side view and a rear view of a display apparatus 100 with an image pickup apparatus according to the first embodiment of the invention. The display apparatus 100 with the image pickup apparatus according to the present embodiment is a display apparatus with the image pickup apparatus which can be used in a video phone, a video conference system, or the like and has a display unit for displaying a received image and an image pickup unit for picking up an image of the user who is watching the received image.

In the diagram, the display panel 108 is a light-transparent display unit and is built in a display panel frame 102. A support member 103 is attached to a rear surface (+z direction in the diagram) of the display panel frame 102. The display apparatus 100 is constructed so that it stands upright by a pedestal 104 fixed to the support member 103.

A photographing optical system to photograph the user (object) who observes a front surface of the display panel 108 is disposed at a rear surface (+z direction in the diagram) of the display panel 108. The photographing optical system is constructed by the camera 106 serving as an image pickup apparatus arranged in an edge portion of a short side direction (y direction in the diagram) of the display panel 108 and a reflection mirror 107 serving as a reflection member for guiding the object light to the camera 106. Since the camera 106 is arranged at a position away from a position on an optical axis of the object light which transmits the display panel 108, the object light which transmitted the display panel 108 is guided to the camera 106 by the reflection mirror 107. Since a distance between the user who observes the display apparatus 100 and the camera 106 can be made longer by the photographing optical system, an angle between the photographing direction in which the camera 106 photographs the user and the viewpoint direction of the user can be decreased. Thus, it is possible to allow a person on the side of the partner who watched the image of the user photographed by the camera 106 to recognize the user as if the user is watching the partner himself.

The camera 106 and reflection mirror 107 constructing the photographing optical system are arranged in a case 105 fixed to the display panel frame 102. The case 105 is enclosed in the support member 103.

The display panel frame 102 and support member 103 of the display apparatus 100 are coupled by hinges 109. Therefore, the display panel frame 102 is rotatable for the support member 103 around an x-axis direction in the diagram as an axis.

FIG. 2 illustrates a side view of the display apparatus 100 with the image pickup apparatus according to the embodiment. FIG. 2 differs from the side view of FIG. 1A in a point that an angle of the display panel frame 102 is changed so that the user faces the display image and can easily watch it. Also in this case, since the case 105 in which the camera 106 and reflection mirror 107 are disposed rotates integratedly with the display panel frame 102, even if the angle of the display panel frame 102 is changed so that the user can easily watch the display image, the user's image can be picked up substantially from the front.

Figure 3A:
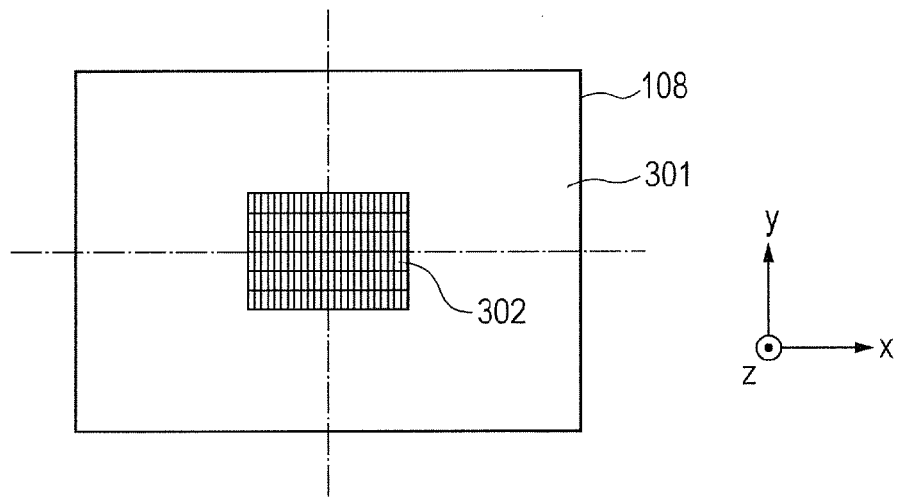
FIGS. 3A and 3B are rear views of a display panel of the display apparatus with the image pickup apparatus according to the first embodiment of the invention.
Figure 3B:
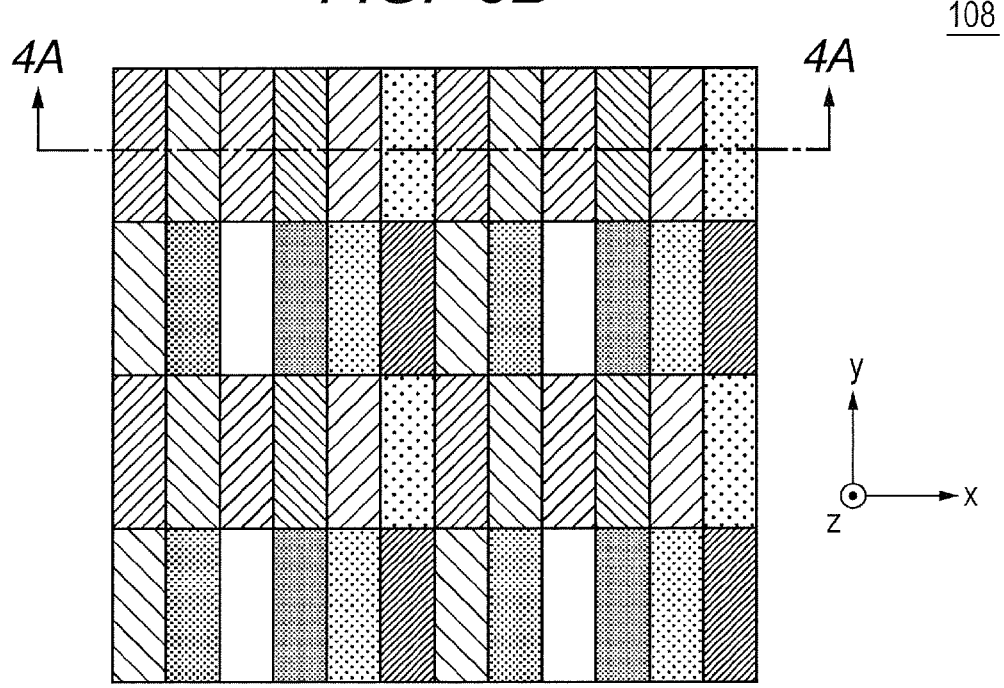

FIGS. 3A and 3B are rear views of the display panel 108. FIG. 3A is the rear view of the whole display panel 108. FIG. 3B is a partially enlarged diagram of the rear view of FIG. 3A. As will be described hereinafter, the display panel 108 constructing a part of the display apparatus 100 in the present embodiment is constructed by a two-dimensional array of pixels including a light-transparent organic EL layer. A rear surface of the display panel 108 excluding an aperture 302 of a center portion is covered with a light-shielding member 301. The aperture 302 of the display panel 108 corresponds to a photographing optical path of the camera 106. Through the reflection mirror, the camera 106 receives the object light which passes through the aperture 302 of the display panel 108 constructed by the organic EL, thereby photographing the user. The light-shielding member 301 may be constructed separately from the display panel 108 or may be integratedly provided in a manufacturing step of the organic EL serving as a display panel 108.

FIG. 3B illustrates (12×4) display pixel portions existing in the aperture 302 where the light-shielding member 301 is not arranged. One display pixel portion has a rectangular shape which is long in the vertical direction (y direction in the diagram) and has such a structure that the display pixels for respectively emitting red, green, and blue light in the horizontal direction (x direction in the diagram) are periodically arranged. One picture element is constructed by three pixels which are arranged in the horizontal direction (x direction in the diagram) and respectively emit the red, green, and blue light. The display panel 108 of the display apparatus 100 of the invention has a phase adjustment member for irregularly adjusting the optical-path length of light transmitting each pixel. In the embodiment, the phase adjustment members of different thicknesses are formed in each display pixel portion on a unit basis of 6 pixels in the horizontal direction and 2 pixels in the vertical direction. By using such a construction that the display pixel portions in which the phase adjustment members of the same thickness are formed at a 6-pixel period in the horizontal direction and at a 2-pixel period in the vertical direction appear, the manufacturing process of the phase adjustment members is simplified.

Subsequently, a construction of the display panel 108 constructing the display apparatus 100 of the present embodiment will be described further in detail.

Figure 4A:
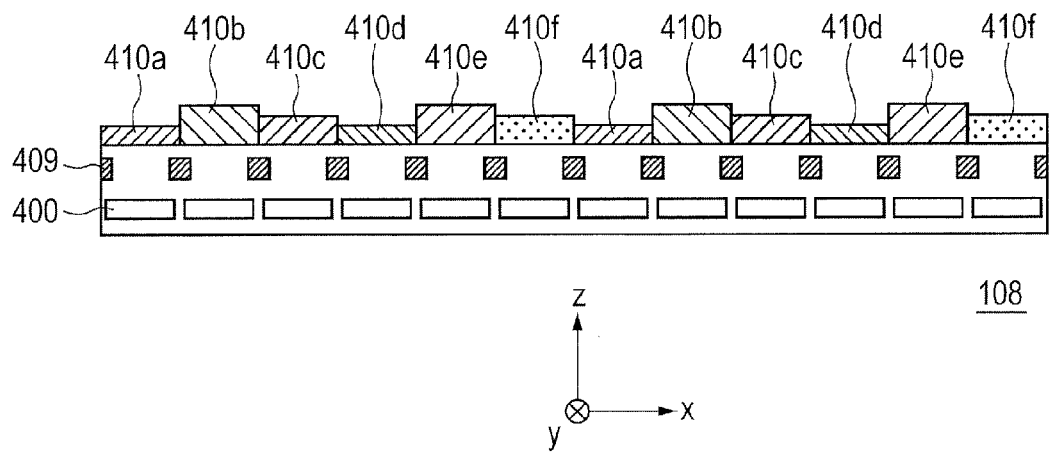
FIGS. 4A and 4B are cross sectional views of the display panel of the display apparatus with the image pickup apparatus according to the first embodiment of the invention.
Figure 4B:
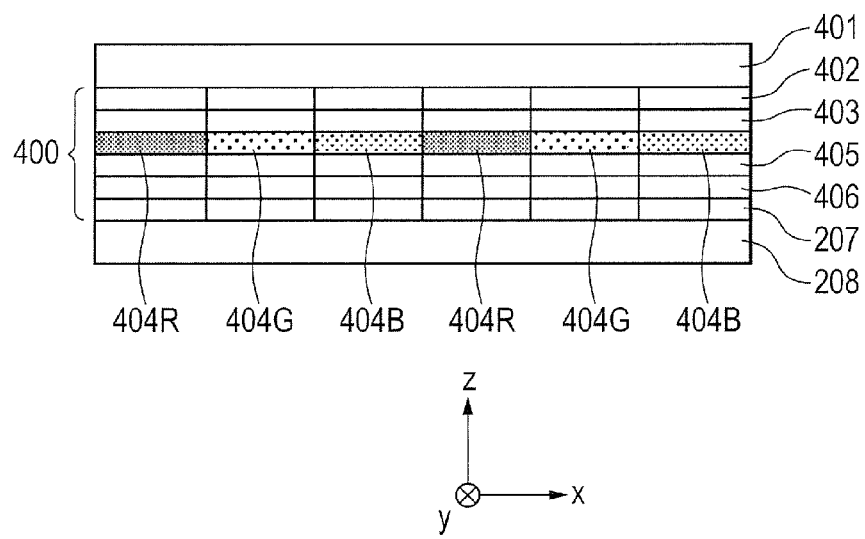

FIGS. 4A and 4B are cross sectional views of the display panel 108. FIG. 4A is the cross sectional view taken along the line 4A-4A in FIG. 3B illustrating the partially enlarged diagram of the rear view of the display panel 108 of FIG. 3A. FIG. 4B is the cross sectional view of an organic EL layer 400 illustrated in FIG. 4A. In the diagrams, a display screen direction is a −z direction.

In the cross sectional view of the display panel 108 of FIG. 4A, the organic EL layers 400 are provided. TFTs 409 for switching and driving are provided on the rear surface side of the organic EL layers 400. A phase adjustment member 410 changes an optical-path length of the light which transmits each display pixel portion existing on the rear surface side (+z direction side) of the display panel 108. The display panel 108 in the present embodiment is an organic EL panel of a top emission type having the organic EL layers 400 on the display screen side and having the TFTs 409 on the rear surface side.

Since the TFT 409 is made of polysilicon or the like and is arranged in a boundary portion of each display pixel portion, it constructs a periodic light-shielding structure. In an area where the TFT 409 is not arranged, the light can transmit and the light which entered from the display screen side (−z direction side) exits from the display panel 108 through the organic EL layer 400 and the phase adjustment member 410.

The phase adjustment member 410 is made of transparent photo-curing resins and is formed by using a UV nanoimprint technology or the like. A thickness of the phase adjustment member 410 (thickness in the optical-axis direction of the incident light) differs in correspondence to each display pixel and is set so that the optical-path length is equal to or less than a wavelength of visible light. For example, it is assumed that a refractive index of the photo-curing resins is equal to 1.51, a thickness of a phase adjustment member 410a is equal to 132 nm, a thickness of a phase adjustment member 410b is equal to 397 nm, a thickness of a phase adjustment member 410c is equal to 199 nm, and a thickness of a phase adjustment member 410d is equal to 66 nm. Similarly, a thickness of a phase adjustment member 410e is equal to 331 nm and a thickness of a phase adjustment member 410f is equal to 265 nm. In each display pixel portion in the present embodiment, the phase adjustment members 410 of the same thickness are formed at a 6-pixel period in the horizontal direction and at a 2-pixel period in the vertical direction as illustrated in FIG. 4A. The predetermined periods of the phase adjustment members of the same thickness in the directions which cross perpendicularly in the two-dimensional array of a plurality of display pixels are not limited to them.

In the case where the camera 106 photographs the user through the display panel 108, the photographing light which entered from the −z direction side in the diagram transmits the organic EL layer 400 and, in the layer where the TFT 409 has been formed, a phase of the photographing light is modulated according to regularity which depends on the period of the display pixels. An optical-path length of the light diffracted in the TFT layer 409 is further changed by the phase adjustment member 410 having an irregular thickness. Therefore, a direction of enhancing the light which transmits the adjacent display pixel portions becomes irregular and a strong diffraction is not caused.

Thus, even if the user is photographed through the display panel 108 of the present embodiment constructed by the organic EL, a good image which is not influenced by the diffraction can be photographed. At the same time, since the camera 106 photographs the user at a position away from the user who observes the display apparatus 100, it is possible to allow the person on the side of the partner who watched the image of the user photographed by the camera 106 to recognize the user as if the user watched the partner himself.

In the display panel 108 of the present embodiment mentioned above, the phase adjustment members 410 having different thicknesses are formed at a period of 6 pixels in the horizontal direction (long side direction). Therefore, although diffraction light corresponding to the 6-pixel period in the horizontal direction of the display pixel portion occurs, since a diffraction angle is very small, the diffraction hardly affects picture quality of the photographed image. Similarly, since the phase adjustment members 410 having different thicknesses are formed at a period of 2 pixels in the vertical direction (short side direction), although diffraction light corresponding to the 2-pixel period in the vertical direction of the display pixel portion occurs, since a diffraction angle is very small, the diffraction affects hardly affects picture quality of the photographed image.

FIG. 4B is a partial cross sectional view of the display panel 108 including the organic EL layer 400. In the organic EL layer 400, a planarization layer 401, an anode 402 made of transparent ITO (Indium Tin Oxide) or the like, a hole-transport layer 403, a light-emitting layer 404, an electron-transport layer 405, and an electron injection layer 406 are provided. Further, a cathode 407 made of ITO or the like and a planarization layer 408 are provided. In the light-emitting layer 404 shown in the diagram, a light-emitting layer 404R emits red light, a light-emitting layer 404G emits green light, and a light-emitting layer 404B emits blue light. Those light-emitting layers are arranged at a 3-pixel period in the x direction in the diagram (long side direction of the display panel 108). Since details of a construction of the light-emitting layer 404 have been disclosed in, for example, the Official Gazette of Japanese Patent Application Laid-Open No. 2009-187697 by the applicant of the present application, its further description is omitted here.

The display panel 108 of the present embodiment is illustrated as an example of the organic EL panel of the top emission type having the organic EL layers 400 on the display screen side and having the TFTs 409 on the rear surface side. However, even in the case of an organic EL panel of a bottom emission type having the TFTs 409 on the display screen side and having the organic EL layers 400 on the rear surface side, by providing the phase adjustment members 410 having irregular thicknesses in each display pixel portion, similar effects can be obtained.

Second Embodiment

Subsequently, the second embodiment of the invention will be described. A display apparatus of the present embodiment differs from the first embodiment in only a construction of the phase adjustment members provided for the display panel 108. Therefore, the display apparatus of the present embodiment also has a construction similar to that of the display apparatus 100 of the first embodiment which is described and illustrated in FIGS. 1A to 3B. The construction of the display panel of the embodiment will be described.

Figure 5A:
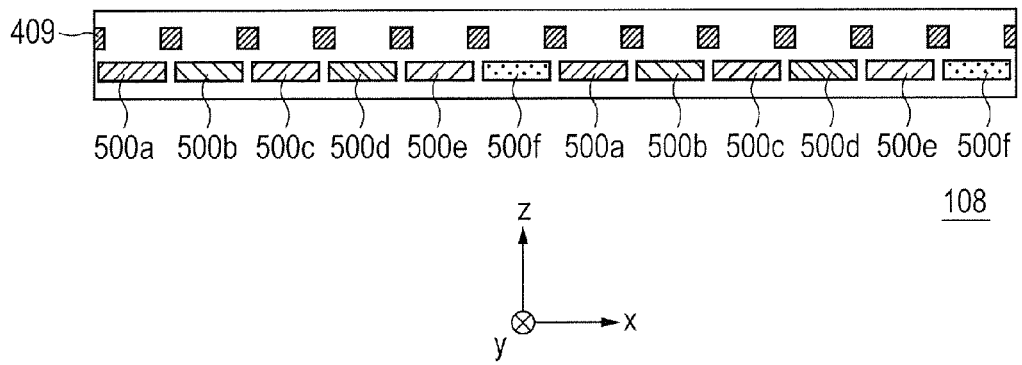
FIGS. 5A and 5B are cross sectional views of a display panel of a display apparatus with an image pickup apparatus according to the second embodiment of the invention.
Figure 5B:
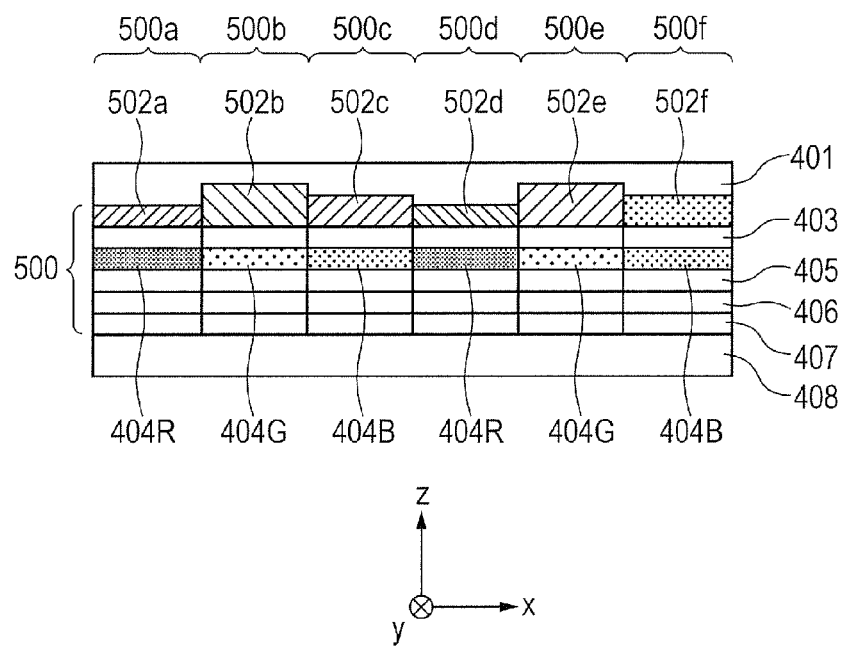
Figure 6A:
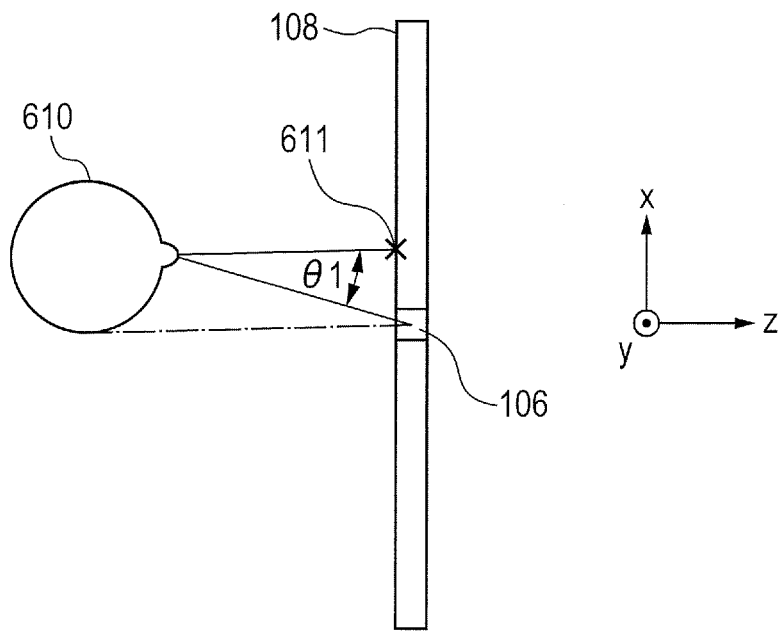
FIGS. 6A and 6B are diagrams for describing a difference between a viewpoint direction of the user and a direction of an image pickup apparatus in a display apparatus with an image pickup apparatus in the related art.
Figure 6B:
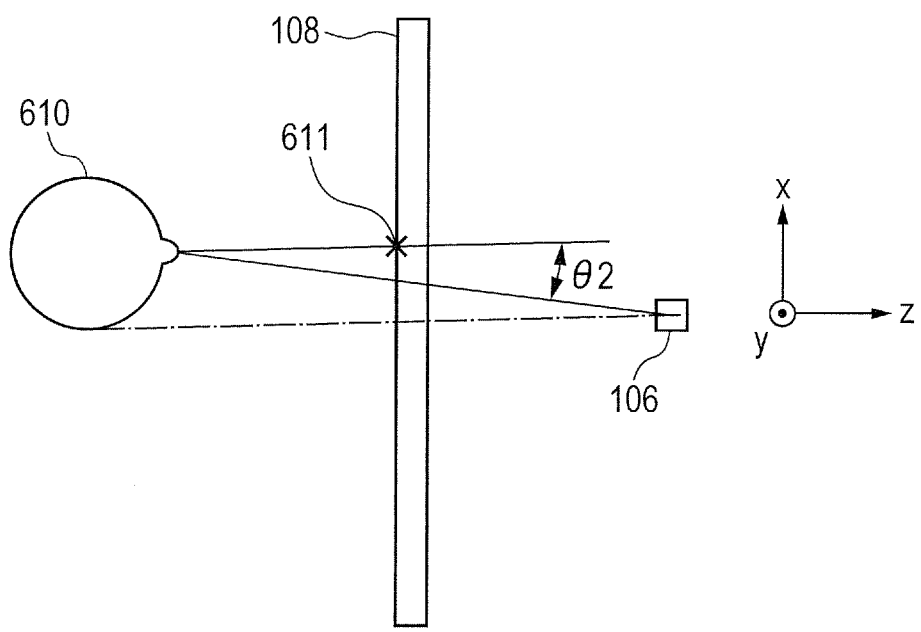

FIGS. 5A and 5B are cross sectional views of the display panel 108 according to the present embodiment. FIG. 5A is the cross sectional view taken along the line 4A-4A in FIG. 3B illustrating the partially enlarged diagram of the rear view of the display panel 108 of FIG. 3A. FIG. 5B is the partial cross sectional view of the display panel including the organic EL layer. In the diagrams, the −z direction indicates the display screen direction. In the diagrams, substantially the same portions as those in FIGS. 4A and 4B are designated by the same reference numerals.

In FIG. 5A, organic EL layers 500 are provided. The TFTs 409 for switching and driving are provided on the rear surface side of the organic EL layers 500. The display panel 108 in the present embodiment is an organic EL panel of the top emission type having the organic EL layers 500 on the display screen side and having the TFTs 409 on the rear surface side.

Since the TFT 409 is made of polysilicon or the like and is arranged in the boundary portion of each display pixel portion, it constructs the periodic light-shielding structure. In the area where the TFT 409 is not arranged, the light can transmit and the light which entered from the display screen side (−z direction side) exits from the display panel 108 through the organic EL layer 500.

In FIG. 5B, the organic EL layer 500 includes the planarization layer 401, an anode 502 made of transparent ITO or the like and arranged on the rear surface side of the display panel 108, the hole-transport layer 403, light-emitting layer 404, electron-transport layer 405, and electron injection layer 406. Further, the cathode 407 made of ITO or the like and the planarization layer 408 are provided. In the light-emitting layer 404 in the diagram, the light-emitting layer 404R emits red light, the light-emitting layer 404G emits green light, and the light-emitting layer 404B emits blue light. Those light-emitting layers are arranged at a 3-pixel period in the x direction in the diagram (long side direction of the display panel 108).

In the present embodiment, the anode 502 has a construction also functioning as a phase adjustment member for changing the optical-path length of the light which transmits each display pixel portion. The anode 502 is made of a transparent conductive member such as ITO or the like and is pattern-printed by a printing method. A thickness of the anode 502 differs in correspondence to each display pixel. In the present embodiment, such a thickness is set in such a manner that a difference between the optical-path lengths of the lights from the display pixels, which transmits the anode 502 and the planarization layer 401, is equal to or less than the half of a wavelength of the visible light. For example, it is now assumed that a refractive index of ITO constructing the anode is equal to 2.0, a refractive index of the planarization layer 401 is equal to 1.5, a thickness of an anode 502a is equal to 200 nm, a thickness of an anode 502b is equal to 600 nm, a thickness of an anode 502c is equal to 300 nm, and a thickness of an anode 502d is equal to 100 nm. Similarly, a thickness of an anode 502e is equal to 500 nm and a thickness of an anode 502f is equal to 400 nm. As illustrated in FIG. 5A, in the present embodiment, the anodes 502 of the same thickness are formed in each display pixel portion at a 6-pixel period in the horizontal direction and at a 2-pixel period in the vertical direction.

In the case where the camera 106 photographs the user through the display panel 108, the photographing light which entered from the −z direction side in the diagram transmits the organic EL layer 500 and an optical-path length is irregularly changed by the anode 502 of the organic EL layer 500. In the layer where the TFT 409 has been formed, a phase of the light which transmits the organic EL layer 500 is modulated according to regularity which depends on the period of the display pixels. However, the direction of enhancing the light which transmits the adjacent display pixel portions becomes irregular and a strong diffraction is not caused.

Thus, even if the user is photographed through the display panel 108 constructed by the organic EL, a good image which is not affected by the diffraction can be photographed. At the same time, since the camera 106 photographs the user at a position away from the user who observes the display apparatus 100, it is possible to allow the person on the side of the partner who watched the image of the user photographed by the camera 106 to recognize the user as if the user is watching the partner himself.

In the present embodiment, since the anodes 502 having different thicknesses are formed at a period of 6 pixels in the horizontal direction (long side direction) of the display panel 108, diffraction light corresponding to the 6-pixel period in the horizontal direction of the display pixel portion occurs. However, since a diffraction angle is very small, the diffraction hardly affects picture quality of the photographed image. Similarly, since the anodes 502 having different thicknesses are formed at a period of 2 pixels in the vertical direction (short side direction) of the display panel 108, although diffraction light corresponding to the 2-pixel period in the vertical direction of the display pixel portion occurs, since a diffraction angle is very small, the diffraction hardly affects picture quality of the photographed image.

In the present embodiment, the example in which the thicknesses of the electrodes (anodes 502) which the organic EL layers (display pixels) have on the rear surface side of the display panel 108 are irregularly constructed and the optical-path lengths of the light transmitting the respective display pixel portions are made irregular has been shown. However, for example, even if the optical-path lengths of the respective display pixel portions are changed by changing the thicknesses of the electron injection layers 406 constructing each organic EL layer 500, similar effects are obtained.

In the first and second embodiments, although a plane mirror is shown as an example of the reflection mirror 107 as a part of the construction of the display apparatus 100, it may be constructed by a spherical reflection mirror whose reflection surface is formed as a convex spherical surface. If the reflection mirror 107 is constructed by the spherical reflection mirror, there is also such an effect that the photographing optical path can be reduced because a size of aperture 302 can be decreased or the like. A hologram mirror may be used as a reflection mirror.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-225213 filed on Oct. 10, 2012, which is hereby incorporated by reference herein in its entirety.

What is claimed is:

1. A display apparatus with an image pickup apparatus, comprising:
   a display unit configured to display an image by a plurality of light-transparent display pixels; and
   an image pickup unit arranged on a rear surface of the display unit to pick up object light from an object at a front surface of the display unit, the image pickup unit being configured to pick up the object light which passes through a plurality of the display pixels of the display unit,
   wherein the display unit has a plurality of light-transparent phase adjustment units which are arranged between the display pixel and the image pickup unit in correspondence to the display pixels and adjust an optical-path length in an a first direction orthogonal with a display surface of the display unit, and
   wherein the plurality of phase adjustment units have different thicknesses in the first direction, and the phase adjustment units having a same thickness are arranged at a period which is larger than an arrangement period of the display pixel of the display unit.

2. The display apparatus according to claim 1, wherein each of the phase adjustment units is arranged on the rear surface side of the display unit of each display pixel.

3. The display apparatus according to claim 1, wherein the plurality of phase adjustment units are electrodes which the respective display pixels have on the rear surface side of the display unit.

4. An apparatus according to claim 1, wherein a period of layout of the phase adjustment units having the same thickness differs in mutually- and perpendicularly-crossing directions of the two-dimensional array of the plurality of display pixels.

5. The display apparatus according to claim 1, wherein the display unit has a light-shielding unit provided at the rear surface, and wherein the light-shielding unit has an aperture for allowing the object light to transmit.

6. The display apparatus according to claim 1, wherein the image pickup unit is arranged at a position different from a position of an optical axis of the object light which enters the display unit, and the display apparatus further has a reflection unit configured to guide the object light which transmits the display unit, to the image pickup unit.

7. The display apparatus according to claim 6, wherein the reflection unit is a reflection mirror, and the reflection mirror is at least one of a plane mirror, a spherical reflection mirror, and a hologram mirror.

* * * * *